Figure 5:
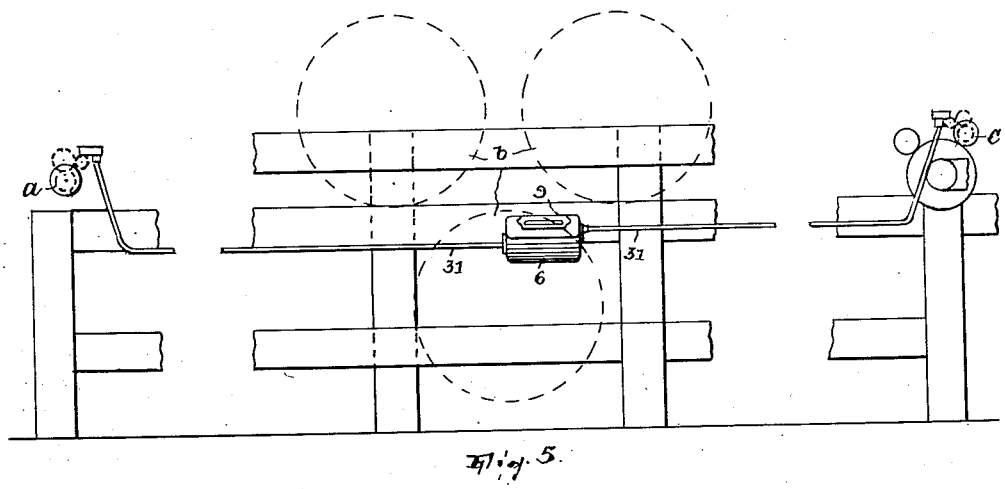

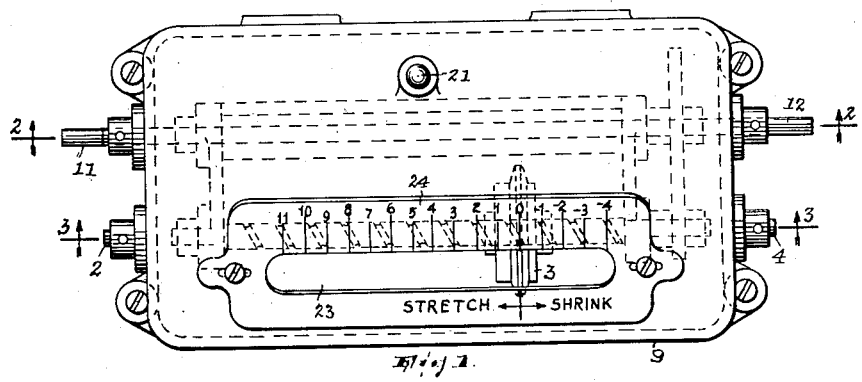

May 16, 1939.  B. M. McCONNELL  2,158,137

SPEED RATIO INDICATOR

Filed March 18, 1938  2 Sheets-Sheet 2

INVENTOR,
Burke M. McConnell,
BY John W. Seward
ATTORNEY.

Patented May 16, 1939

2,158,137

UNITED STATES PATENT OFFICE 2,158,137

SPEED RATIO INDICATOR

Burke M. McConnell, Greensboro, N. C.

Application March 18, 1938, Serial No. 196,774

1 Claim. (Cl. 235—103.5)

Herein is set forth a novel means for indicating the ratio of the speeds of two rotary elements of a machine. The said means has various possible applications among which is to machines in which textile sheets while undergoing travel also are made or allowed to undergo change in extent, i. e., stretching or shrinkage. Thus it may be applied to a warp-sizing machine wherein the warp is by suitable means drawn into the machine at a certain rate but is acted on by means posterior to the first means and which is of the variable-speed class and so may coact with said first means to stretch or distend the warp while in transit or, by being rotated at some speed less than that at which the warp is drawn into the machine, permit shrinkage.

Figure 6:
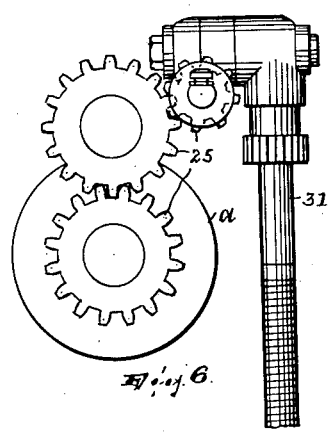
Figure 7:
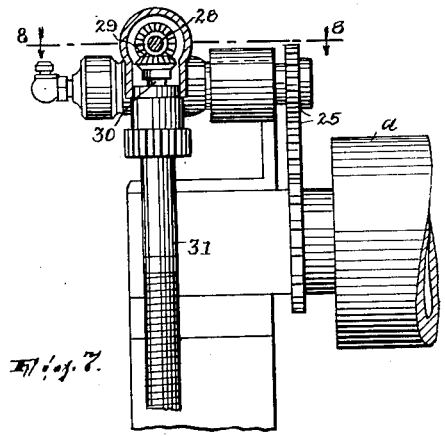
Figure 8:
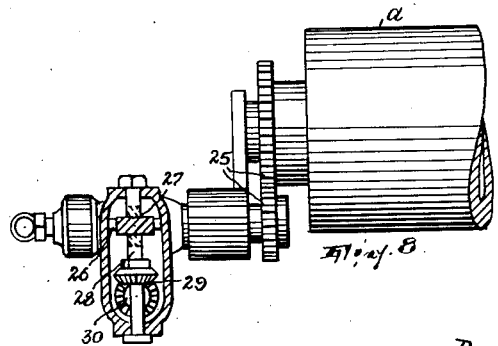

In the drawings,

Fig. 1 is a plan of the indicator of this invention;

Figs. 2 and 3 are sections thereof on lines 2—2 and 3—3, respectively, of Fig. 1;

Fig. 4 is an end elevation thereof;

Fig. 5 is a side elevation of a warp-sizing machine of well-known type, showing the indicator applied thereto; and Figs. 6, 7 and 8 show the means whereby motion may be transmitted from an element, as $a$, of the machine to one of the rotary structures of the indicator, Figs. 6 and 7 being side elevations at right angles to each other, with a part of Fig. 7 shown in section, and Fig. 8 being a section on line 8—8, Fig. 7.

Let 1 be a rotary cone structure in substantial parallelism with the axis of which is the axis of a rotary structure comprising an axial member and a nut member revoluble thereon and having some threaded engagement with the axial member, as a screw 2 to afford the axial member and a nut 3 thereon, the nut in turning on the screw being caused to travel along the screw as an incident of its engagement with the threading thereof—here a groove $2a$ in which engages a pin $3a$ of the nut. The conical periphery of the cone structure and the periphery of the nut are in constant tractive engagement with each other due to one structure (here the structure 2) being movable back and forth and normally urged toward the other structure. The two structures are rotated in reverse directions by independent means. So long as at any time the peripheral speed of the nut is the same as that of the cone in the particular zone of the latter with which the nut then engages the nut will be held by its engagement with the threading of the screw against displacement in either direction lengthwise of the latter. But if the screw or the cone structure is made to rotate at a different speed from that of the other of them there will ensue displacement of the nut along the screw one way or the other, thus: Assume that the directions of rotation are as indicated by the arrows in Fig. 4 and that the screw is as shown right-hand. If the speed change is such that the faster rotation favors the screw the latter will be turned in the nut and so the nut will travel along the screw to the left; if the speed change is such that the faster rotation favors the cone the nut will turn on the screw and travel along the screw to the right. In each case as soon as the nut in its travel along the screw attains that zone of the cone whose peripheral speed and that of the nut are then the same the nut will again be held against axial displacement by and relatively to the screw. The stationary position of the nut relatively to the screw lengthwise thereof determines the speed ratio of the two structures. So much indicates the essentials of my invention. Describing the same now in the embodiment shown in the drawings:

The cone structure here includes a shaft 4 to which the cone is fixed and which is journaled preferably in anti-friction bearings 5 in the lower section 6 of a support in the form here of a casing, and on this shaft adjoining the ends of the cone are preferably journaled rolls 7 respectively of the same diameter as the adjoining ends of the cone, being held from displacement therefrom by collars 8 fixed to the shaft. The screw is journaled, as will appear, in a carrier movable toward and from the cone.

In said section of the casing and in the upper section or cover 9 thereof are respectively journaled, as in anti-friction bearings 10, two shafts 11 and 12 projecting in opposite directions from the casing. Shaft 11 is geared by gearing 13—14 with the cone shaft and shaft 12 is geared by gearing 15—16 with one end of the screw.

The screw is supported by the mentioned carrier, 17, which is pivoted and here a bar having upstanding terminal portions supported by anti-friction bearings 18 on the shaft 12, such terminal portions respectively having arms $17a$ (Fig. 4) which project over the cone structure and have anti-friction bearings 19 in which the reduced ends of the screw are journaled. The bar may have a rearwardly projecting arm $17b$ which is connected by a spring 20 with a screw 21 penetrating the cover and supported thereon by a nut 22, the screw and nut affording means to determine the pressure of the nut 3 on the cone.

The freely rotated rolls 7 are present so that if, perchance, the nut should run off the cone it will then idle or cease to be driven rotatively relatively to the screw and hence its axial travel will cease.

Of course the parts so far described will usually be of metal except for the periphery or tread portion of nut 3 which is preferably afforded by a disk 3x of leather, rubber or other soft material providing effective traction.

Parallel with the screw are an aperture 23 in the casing cover and a scale 24 reading from zero left and right, the nut being coactive with the scale as a pointer.

In Fig. 5 the indicator is shown applied to a warp-sizing machine embodying, as in the Johnson Patent No. 2,007,828, for example, a roll $a$ at the input end of the machine rotating with the warp at a given rate determined by the speed of rolls which draw the warp into the machine and may be parts of the size applying means or quetch (not shown) and a roll $c$ at the output end of the machine and rotated at some selected speed which will effect stretching or permit shrinkage of the warp or perhaps coact with roll $a$ so as to be neutral with respect to stretching or permitting shrinkage of the warp. (At $b$ is shown the means, as heated drums, which dries the size on the warp after it passes the quetch). Rolls $a$ and $c$ are to be respectively connected with the mentioned structures of the indicator so as to drive them at their respective speeds. The transmitting means from either roll to the structure driven therefrom may be the same as that from the other roll to the structure driven therefrom. Thus:

Roll $a$ is shown connected by gearing 25 with a shaft 26 which by spiral gearing 27 is connected with a countershaft 28 in turn connected by bevel gearing 29 with a flexible shaft 30 coupled to shaft 11, parts 26 to 30 being contained in a suitable flexible housing 31.

Depending on various conditions taken into account by the operator, such as the temperature, degree of liquidity and depth of the size bath, pressure imposed on the warp during its treatment, and other matters, the operator knows that a particular warp requires a certain amount of stretch applied thereto or to be permitted a certain degree of shrinkage during the sizing operation. Instead of calculating the speed ratios of rolls $a$ and $c$, as heretofore, in order to obtain the desired degree of stretch of shrinkage he may by this invention depend with accuracy on the indicator which, by the stationary position of the nut opposite a given numeral on the scale, shows at all times the speed-ratio and hence the degree of such stretch or shrinkage, as the case may be.

Having thus fully described my invention what I claim is:

Mechanism for the purpose described including a support, a pair of independently rotative elements journaled therein with their axes substantially parallel, a rotary structure having a substantially conical periphery, another rotary structure comprising an axial member and a nut member revoluble on the axial member and having its periphery in contact with that of the cone structure and said members having a threaded engagement with each other, said structures having their axes substantially parallel with the axes of and being respectively geared with said elements and one being journaled in said support, and a carrier in which the other structure is journaled pivotally supported on the element with which the latter structure is geared, said carrier and latter structure being normally urged toward the other structure.

BURKE M. McCONNELL.